United States Patent [19]

Schoenwald

[11] 4,435,162
[45] Mar. 6, 1984

[54] TRIGONOMETRY VISUALIZERS AND METHOD OF MAKING SAME

[76] Inventor: Justin P. Schoenwald, 876 Burrow Rd., Ontario, N.Y. 14519

[21] Appl. No.: 452,128

[22] Filed: Dec. 22, 1982

[51] Int. Cl.³ ............................................. G09B 23/04
[52] U.S. Cl. ................................................. 434/215
[58] Field of Search ...................... 434/215; 235/88 M

[56] References Cited

U.S. PATENT DOCUMENTS

| | | | |
|---|---|---|---|
| 2,234,896 | 3/1941 | De Turk | 434/215 |
| 2,521,930 | 9/1950 | McPartlin | 434/215 |
| 3,021,058 | 2/1962 | Horton | 434/211 X |
| 3,042,301 | 7/1962 | Seale | 235/88 M |
| 3,347,458 | 10/1967 | Thiel | 235/88 M |
| 3,359,653 | 12/1967 | Redfern | 434/215 |
| 3,377,718 | 4/1968 | Savin et al. | 434/215 |
| 3,827,163 | 8/1974 | Grimes | 434/215 |

*Primary Examiner*—William H. Grieb
*Attorney, Agent, or Firm*—Shlesinger, Fitzsimmons & Shlesinger

[57] ABSTRACT

A transparent face plate has inscribed thereon a first circle surrounded by graduations which divide it into zero through 360°. Two lines of transparency, which are denoted sine and cosine, respectively, intersect at right angles at the center of the circle, and at opposite sides of the center are divided into decimal graduations 0.01 through 1.0. Mounted to rotate beneath the base plate is a disc having inscribed on its face an indicator circle having a radius equal to one half of that of the first-named circle, and located in offset relation to the latter, so that the indicator circle extends at one diametral side through the center of the first circle, and at its opposite diametral side registers tangentially with said first circle. A pointer is inscribed on the face of the disc to be viewable against the degree graduations on the face plate, so that when the disc is rotated, the indicator circle thereon is swung successively beneath the intersecting transparent lines of the face plate, so that where the periphery of the indicating circle intersects one of these lines the decimal equivalent of the corresponding trigonometric function will be indicated.

10 Claims, 4 Drawing Figures

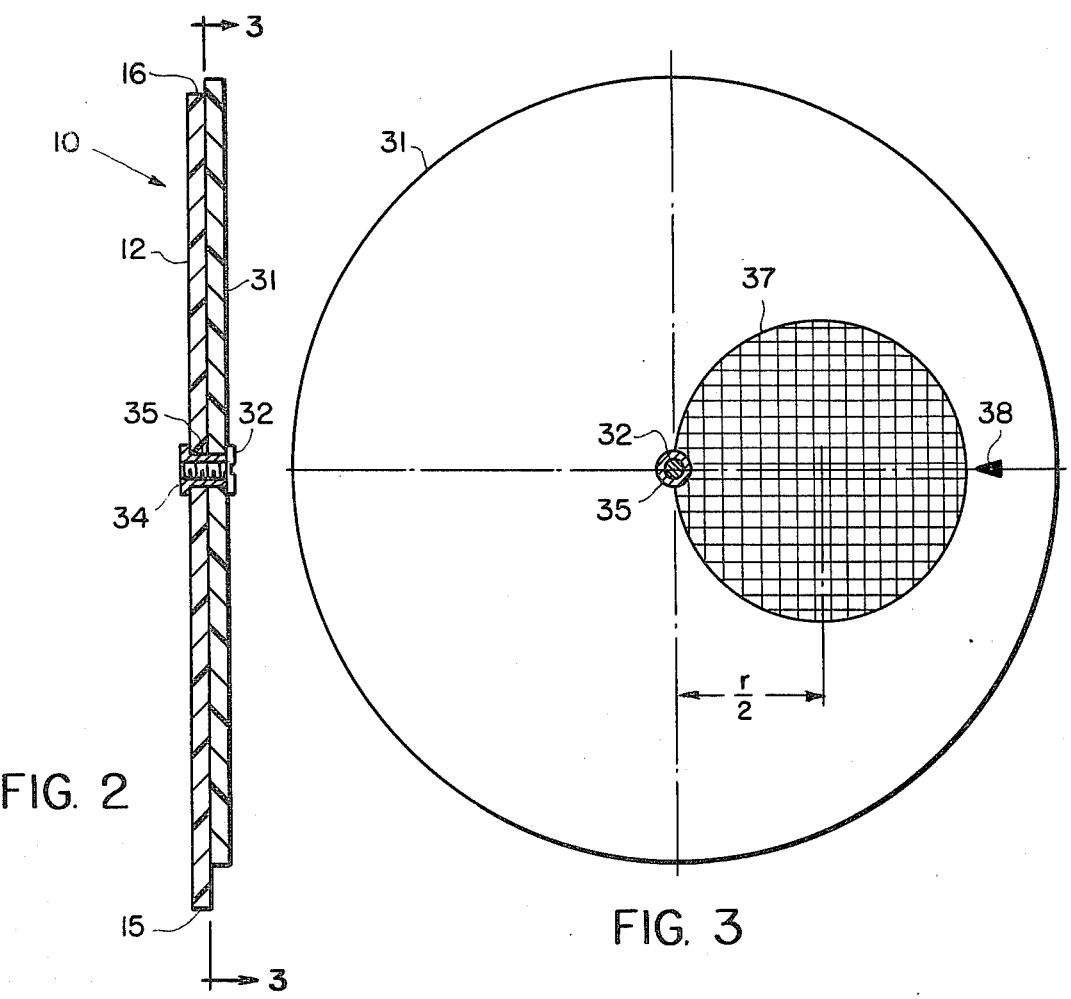
FIG. 2
FIG. 3
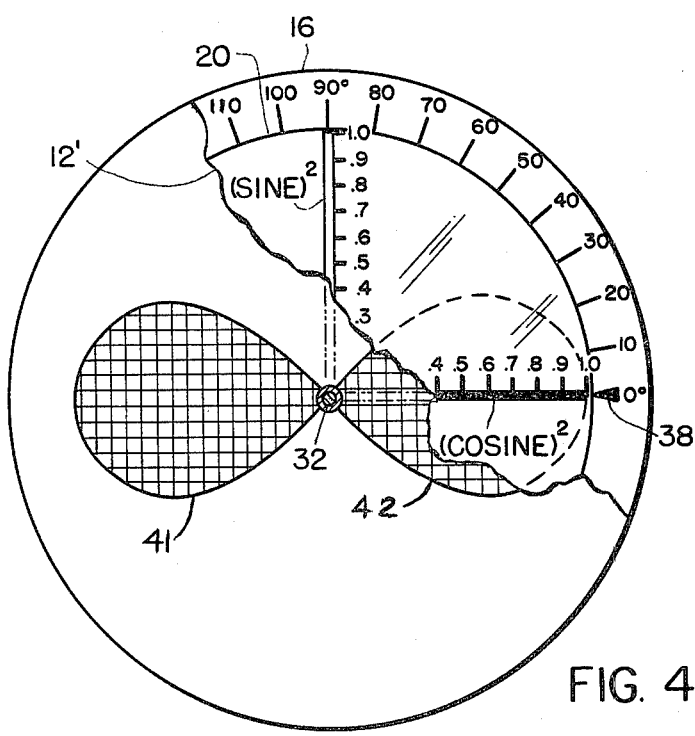
FIG. 4

TRIGONOMETRY VISUALIZERS AND METHOD OF MAKING SAME

BACKGROUND OF THE INVENTION

This invention relates to teaching aids, and more particularly to a manually-operable device which simplifies the understanding of trigonometry, and specifically the understanding of and familiarization with the sine and cosine functions.

Textbook treatments of trigonometric functions necessarily employ static pictorial representations of plane triangles and curves for use in illustrating the trigonometric functions. However, the application of trigonometric principles in fields such as engineering and physics necessarily involves an understanding of such principles as applied to time-varying functions. For a proper understanding of such trigonometric functions, therefore, the student ideally should have an awareness of the relationship of the quadrants of a circle to the signs (plus or minus) of trigonometric functions, and the approximate values of the sine and cosine functions for any and all angles. Although there are some conventional mneomonic devices available to aid the students, each is designed to provide, in general, a static illustration of such relationships.

U.S. Pat. No. 2,234,896, for example, discloses a trigonometric identifier including a pair of discs rotatably mounted coaxially one above the other on a substrate. The upper disc has a pointer on its periphery and an opening for viewing any one of twenty-four different indicium printed on the face of the lower card. The lower disc also has a pointer on its periphery and when the two discs are rotated to positions in which their pointers register with certain indicia printed on the substrate, the proper answer appears beneath the opening or window in the upper disc.

U.S. Pat. No. 2,521,930 discloses a trig-meter comprising a rotatable disc mounted between two plates for manual rotation through registering finger openings in the outer plates. The disc has marked on one face a plurality of concentric circles divided into quadrants and a series of triangles, while the opposite face bears similar markings but only one circle. By rotating the disc into different angular positions various trig functions can be viewed through a plurality of differently-shaped openings in the upper plate.

Additional aids are disclosed in U.S. Pat. No. 3,042,301 and U.S. Pat. No. 3,347,458, but relate to far more complicated devices for displaying trigonometric functions.

There are currently available also, of course, electronic calculators which obviously facilitate the computation of trigonometric functions; but the visualization of these functions in relationship to a circle have been left to the student's imagination.

It is an object of this invention, therefore, to provide a relatively simple and inexpensive device for readily displaying to a student, or the like, the relationship between the angles and trigonometric functions.

Still another object of this invention is to provide a novel hand-held and operated device, which is capable readily of illustrating basic trigonometric functions relative to a circle and which is capable also of illustrating both the decimal values of such functions for given angles, and the approximate rate of change of such values with changing angles.

Other objects of the invention will be apparent hereinafter from the specification and from the recital of the appended claims, particularly when read in conjunction with the accompanying drawings.

SUMMARY OF THE INVENTION

The visualizer comprises a pair of circular discs connected at their centers for relative rotation coaxially of one another. The upper disc has thereon a large circle disposed coaxially of the common axis of the discs; and the lower disc has on its face a smaller circle the diameter of which is one half that of the circle on the upper disc. The circle on the lower disc is radially offset from the axis of the discs by an amount equal to its radius so that it registers tangentially at one diametral side thereof with the circle on the upper disc and at its opposite side with the common axis of the discs. A pointer on the periphery of the lower disc is viewable through the upper disc, and when the discs are rotated relative to each other, registers selectively with a plurality of graduations on the upper disc which divide the large circle into its degree values 0 through 360°.

The circle on the upper disc is divided into four quadrants (I through IV) by two intersecting lines or zones. One of these lines, which registers at opposite ends with the zero and 180° graduations, is denoted COSINE: and the other line, which registers with the 90° and 270° graduations, is denoted SINE. At opposite sides of the center each line is divided into a plurality of equal graduations denoted 0.1 through 1.0, with the graduations of each line at one side of center being denoted positive, and with those at the opposite side negative.

The two intersecting lines or zones on the upper disc may comprise transparent areas or spaces through which the circle on the underlying disc is viewable as the latter is rotated. When the pointer is at zero degrees the circle on the underlying disc is located centrally beneath the positive cosine line, and assuming that it is of a color that contrasts with the upper disc, the positive cosine line will register fully with the contrasting color thereby giving an indication that the cosine has the value of 1.0. The sine and negative cosine lines, however, will at this time indicate a zero value. However, if the pointer is moved from zero toward 90°, the underlying circle will swing from beneath the positive cosine line and will rotate eventually into complete registry with the positive sine line, which is spaced 90° from the positive cosine line. During this movement the cosine value will gradually decrease to zero as the sine value increases toward the value of 1.0.

In a similar manner as the pointer continues its rotation beyond 90°, the positive sine value, as indicated by the underlying circle, will begin to drop at the same time that the value of the negative cosine line will begin to increase, reaching a maximum value of 1.0 when the pointer finally reaches 180°. When rotated from 180° to 270° the underlying circle will cause the negative cosine values to appear to drop while the negative sine values increase to 1.0 at 270°; and as the pointer thereafter rotates from 270° back to zero degrees (360°), the negative sine values will decrease while the positive cosine value increases back to 1.0.

THE DRAWINGS

FIG. 2 is a sectional view taken along the line 2—2 in FIG. 1 looking in the direction of the arrows;

FIG. 3 is a sectional view taken along the line 3—3 in FIG. 2 looking in the direction of the arrows; and FIG. 4 is a plan view of a modified form of visualizer the face plate of which is cut away in part to illustrate better the face of the lower disc, which is used in this second embodiment of the invention.

DETAILED DESCRIPTION OF THE PREFERRED EMBODIMENTS

Figure 1:
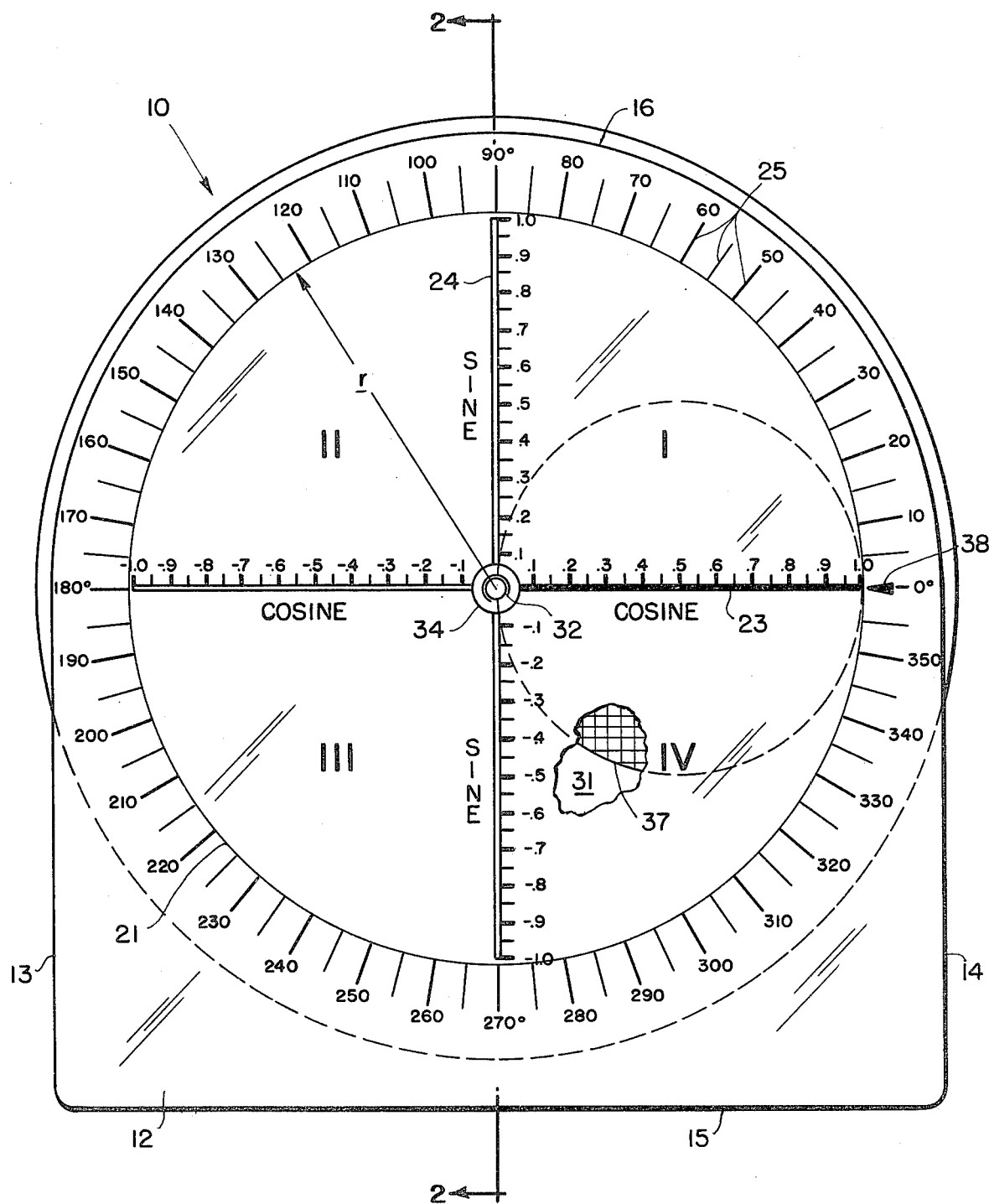
FIG. 1 is a plan view of a trignometry visualizer made according to one embodiment of this invention, a portion of the upper disc of the visualizer being cut away for purposes of illustration.

Referring now to the drawings by numerals of reference, and first to FIGS. 1-3, 10 denotes generally a visualizer comprising a transparent face plate or upper plate 12 having spaced, parallel side edges 13 and 14, a straight lower edge 15 extending transversely between the side edges, and a curved upper edge 16, which is generally semicircular in configuration. Inscribed or otherwise formed on plate 12 coaxially of its upper edge 16 is a circle 21, which is divided by two intersecting lines or zones 23 and 24 of transparency into four right annular quadrants I, II, III, and IV. Radially outwardly thereof circle 21 is divided into five degree integrals by a plurality of equiangularly spaced graduations 25. As shown in FIG. 1, line 23 extends between the zero and 180° graduations and is denoted COSINE, while the line 24 extends between the 90° and 270° graduations and is denoted SINE.

Rotatably secured to the back of plate 12 coaxially of circle 21 is a circular disc or indicator plate 31, which in the embodiment illustrated has a radius larger than the radius of the curved edge 16 of the upper plate 12. Disc 31 is connected to plate 12 by a screw 32, the shank of which extends through a central opening in disc 31 and into the internally threaded bore of a nut 34, which has a reduced diameter end 35 extending rotatably and coaxially into a registering opening in plate 12. Confronting surfaces of disc 31 and plate 12 are thus held in sliding, rotatable engagement with each other.

Formed on the disc 31 to face the back of plate 12 is an indicator circle 37, which has a diameter equal to the radius (r in FIG. 1), of circle 21. The center of circle 37 is radially offset from the axis of circle 21 a distance equal to one half the radius of circle 21. As a consequence, and as shown by FIGS. 1 and 3, circle 37 at one side thereof is disposed tangentially of circle 21, and at its diametrally opposite side extends through the common center of circle 21 and disc 31. Moreover, the portion of disc 31 lying within circle 37 is a color or shade which contrasts with that of plate 12, so that any portion of circle 37 that registers with any of the two transparent zones 23 and 24 will be readily viewable from the face of plate 12.

Also formed on disc 31 outwardly of the circle 37 is a triangularly shaped pointer 38 (FIG. 3), which has a pointed end facing circle 37 at the side thereof diametrally opposite the center of the mounting screw 32. As shown in FIG. 1, the pointer 38 is viewable through the transparent face plate 12, and is disposed to register selectively with the angularly spaced graduations 25 as the disc 31 is rotated relative to the face plate. In its position as shown in FIG. 1 pointer 38 registers with the zero degree graduation and points directly at the half of the COSINE line 23 which separates quadrants I and IV. This portion of the COSINE line is divided into a series of graduations which increase in value from 0.1 adjacent the screw 32 to a value of 1.0 at the point where this portion of the line 23 intersects circle 21. The opposite half of COSINE line 23, which separates quadrants II and III, is likewise divided by spaced graduations which increase in value from a $-0.1$ adjacent screw 32 to a $-1.0$ at the point where this end of the line 23 intersects circle 21 at the 180° notation.

It will be noted also that the upper half of the SINE line 24 (the half extending from screw 32 toward the 90° graduation) is graduated into equal increments which increase in value from 0.1 adjacent screw 32 to a value of 1.0 at the point where this portion of line 24 intersects the circle 21; and the opposite or lower half of the line is likewise divided by a plurality of spaced graduations which increase from a value $-0.1$ to a value of $-1.0$ at the point where this end of line 24 intersects circle 21 at the 270° graduation.

In use, if it is desired to determine the value of the sine and cosine of a particular degree value, say for example 60°, the disc 31 is rotated until the pointer 38 registers with the 60° graduation. During this rotation the underlying circle 37 will begin to rotate about the axis of screw 32, so that its outer periphery will appear gradually to travel inwardly along the positive section of the transparent COSINE line or zone 23, and upwardly along the transparent portion of the line 24 which is denoted as the positive SINE. By the time that the pointer 38 reaches the 60° graduation the outer periphery of circle 37 will have reached the 0.5 designation along the positive COSINE line and the 0.86 designation along the positive portion of the SINE line, thus indicating the decimal values of these functions at 60°.

Whenever the pointer 38 is rotated 180° from its position as shown in FIG. 1, the circle 37 on the disc 31 will be likewise rotated 180° about the screw 32, so that its periphery will have disappeared from the positive SINE line and will have progressed outwardly along the minus COSINE line to the point where it will have become tangent to the circle 21 at 180° mark on plate 12. This provides an indication that the SINE value at this time is zero, and that the COSINE value is $-1.0$. It will be readily apparent, therefore, that simply by rotating the disc 31 relative to the plate 12 it will be possible for a student not only to determine simultaneously the specific values of the SINE and COSINE functions for a given angle, but also the student will be better able to appreciate the rate at which these values change in relationship to changes in angular values.

In accordance with this invention it is possible to produce still other types of visualizers utilizing essentially the same principles employed in connection with the above-described face plate and rotatable bottom disc. For example, as shown in FIG. 4 a disc 31' is mounted by a screw 32 to rotate beneath a face plate 12' which is similar to that disclosed in the first embodiment, except that it comprises only one half of each of the two intersecting zones that were denoted 23 and 24 in FIGS. 1 and 3. These modified zones are denoted as $(SINE)^2$ and $(COSINE)^2$ in FIG. 4, and intersect each other at a right angle to define therebetween a quadrant similar to that denoted as the first quadrant (I) in the first embodiment. The other difference is that, instead of using the single circle 37 on the disc 31, the disc is provided with two, opposed, generally oval-shaped areas 41 and 42, which extend outwardly from diametrally opposite sides of the mounting screw 32. These two oval-shaped areas are of a shape such that portions thereof, which denote the values $(COSINE)^2$ and $(SINE)^2$ [i.e., the square of the cosine and the square of the sine, which are always non-negative], will continually register with the transparent zones during a full rotation of the lower disc, as pointer 38 progressively indicates the angle value from 0° to 360°.

From the foregoing it will be apparent that the present invention provides a relatively simple and inexpensive device for immediately conveying to a student the relationship between various trigonometric functions and related angles and quadrants of a circle. Not only does the visualizer function as an instrument for determining the respective decimal values of various trigonometric functions for a given angle from zero to 360°, but it also is helpful in visually conveying to students the dynamic relationship between the functions and the angles of a circle, as well as enabling them to perceive the relative rates at which these changes occur with the increase or decrease in the value of angles.

While the invention has been described in connection with the use of a transparent face plate 12, it will be readily apparent that instead of using intersecting transparent lines 23 and 24 for viewing the underlying disc 31 and the markings thereon, it would be possible simply to employ slots in the face plate 12 in the areas of lines 23 and 24 to provide this visibility. Likewise, it will be readily apparent that by coloring the area within the circle 37 differently from, or in a contrasting color to, that of the overlying face plate 12, it will be possible to read the changes through the lines 23 and 24 somewhat more easily than if a simple circle 37 were to be employed. Moreover, although only instruments for determining sine, cosine and squared values thereof have been illustrated and described herein, it will be apparent that this invention is capable of still further modification, and that this application is intended to cover any such modifications as may fall within the scope of one skilled in the art, or the appended claims.

Having thus described my invention, what I claim is:

1. A trigonometric visualizer, comprising
    a pair of plane members connected together for rotation relative to each other about a common axis,
    means defining a first circle on one of said members coaxially of said axis,
    means defining on said one member a pair of radial extending zones which intersect at right angles at said axis and which define therebetween at least one quadrant of said circle,
    a plurality of spaced graduations arranged along each of said zones and denoting the decimal values of one of two trigonometric functions for a ninety degree interval about said axis,
    a plane geometric figure formed on the other of said members and having a periphery viewable through said zones during relative rotation between said members, and
    means for indicating the degree to which said members are rotated relative to each other,
    said periphery being operative, at the point where it intersects one of said zones, to indicate the decimal value of the associated trigonometric function corresponding to the indicated degree of relative rotation between said members.

2. A trigonometric visualizer as defined in claim 1, wherein said geometric figure comprises a second circle having a diameter equal to half the diameter of said first circle.

3. A trigonometric visualizer as defined in claim 1, wherein said geometric figure is one of two, generally oval-shaped figures which project outwardly from diametrally opposite sides of said axis.

4. A trigonometric visualizer as defined in claim 1, wherein said one member is made of a transparent material.

5. A trigonometric visualizer as defined in claim 1, wherein said zones comprise radial slots in said one member.

6. A trigonometric visualizer as defined in claim 1, wherein one of said trigonometric functions is cosine and the other sine.

7. A trigonometric visualizer as defined in claim 1, wherein one of said trigonometric functions is $(cosine)^2$ and the other is $(sine)^2$.

8. A trigonometric visualizer as defined in claim 1, wherein
    said zones extend diametrally across said first circle at right angles to each other and are used to measure sine and cosine functions respectively, and
    said geometric figure comprises a second circle having a diameter equal to one half that of said first circle and positioned to register at one side thereof with said axis, and to register at its diametrally opposite side tangentially with said first circle.

9. A trigonometric visualizer as defined in claim 8, wherein said means for indicating said degree of relative rotation comprises
    a plurality of angularly spaced graduations arranged around said first circle with zero and 180° notations registering with opposite ends respectively, of said line used to measure the cosine function, and
    a visible pointer on said other member aligned with the axes of said first and second circles and disposed to be readable against said graduations during relative rotation between said members.

10. A trigonometric visualizer comprising
    a first member having thereon a first circle divided into four quadrants by a pair of linear zones, which extend diametrally of said circle and intersect each other at right angles at the center of said circle, and which are graduated intermediate their ends to denote the decimal values of the sine and cosine, respectively, of any angle from zero to 360°,
    a second member mounted beneath said first member for rotation relative thereto coaxially of said first circle,
    a second circle formed on said second member with its periphery extending at one diametral side thereof through the axis of said first circle and have its diametrally side opposite registering tangentially with said first circle, and
    a pointer mounted for rotation with said second member adjacent the diametral side of the second circle opposite said axis, and disposed to register with an array of spaced graduations arranged around said first circle to denote the degree of rotation of said members one relative to the other from a zero degree position,
    said linear zones being transparent, whereby upon rotation of said second member relative to said first member, said second circle is rotated about the center of said first circle, and the decimal values of said functions at any instant are determined by the points where the periphery of said second circle intersects said zones.

* * * * *